July 10, 1956
H. J. KERSTEN
2,754,063
CYCLICAL AUTOMATIC CONTROL DEVICE
Filed Dec. 2, 1952
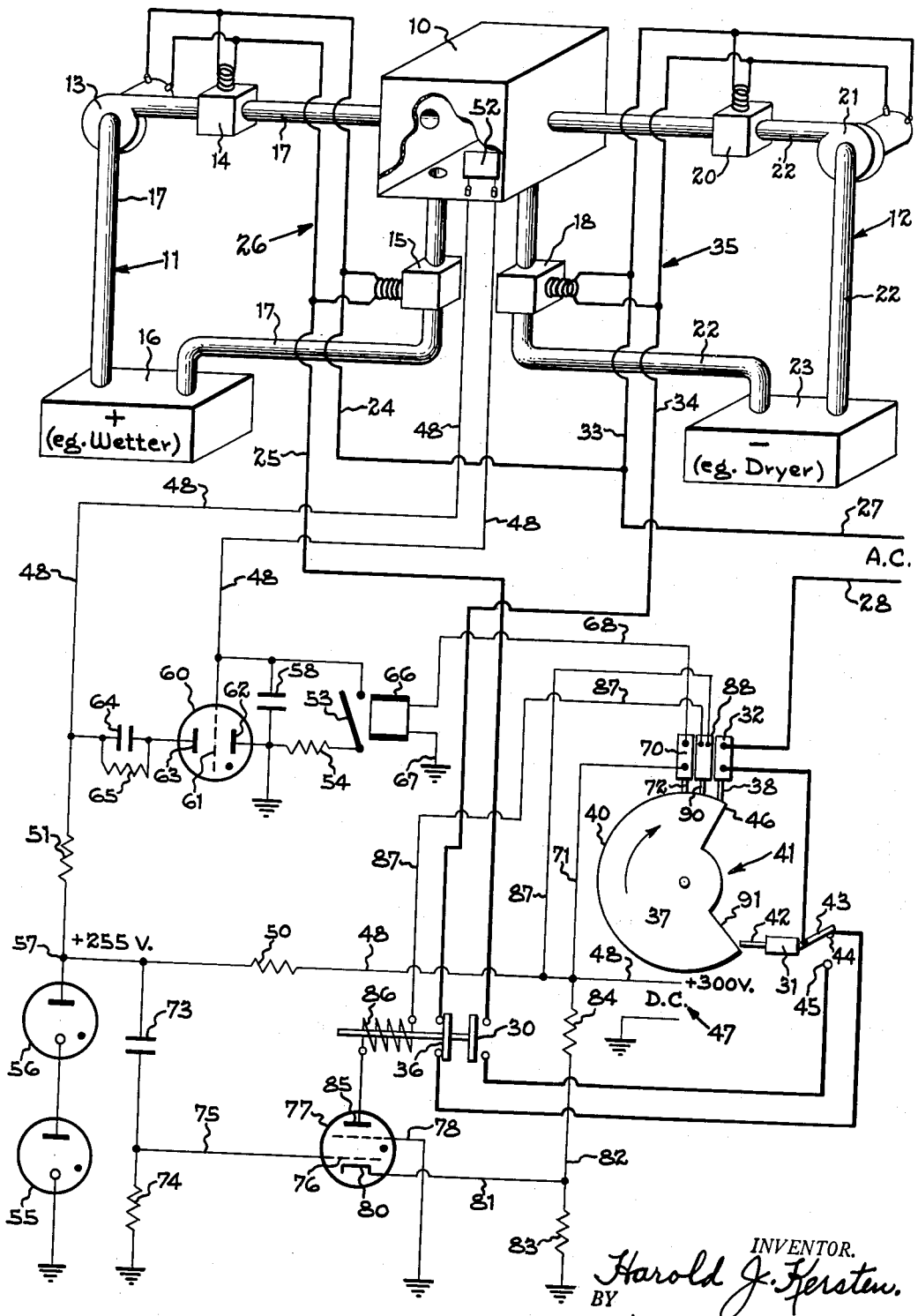
INVENTOR.
Harold J. Kersten.
BY
Wood, Herron & Evans.
ATTORNEYS.

United States Patent Office 2,754,063
Patented July 10, 1956

2,754,063
CYCLICAL AUTOMATIC CONTROL DEVICE

Harold J. Kersten, Cincinnati, Ohio

Application December 2, 1952, Serial No. 323,664

15 Claims. (Cl. 236—44)

This invention relates to devices for performing the operations of controlling, measuring, recording, and indicating, either separately or in combination of two or more of those operations, a variable condition such as temperature, humidity, pressure, or the like, and is particularly directed to a device utilizing one or more condition sensing elements, in a circuit whose electrical impedance varies in accordance with the condition being controlled, measured, etc.

At the present time, many electrical circuit elements are known which exhibit characteristics such that when inserted in a suitable circuit, the impedance characteristics of that circuit will vary in response to changes in one or more of the conditions constituting the physical or chemical state, or the environment of the element. Thus, for example, there are resistance elements having an impedance, variable in accordance with temperature changes, or with changes in the humidity of their environment. Similarly, capacitors have been constructed in such a manner that their impedance is dependent on the distance separating the condenser plates as in pressure control, or the area of the plates, and on the chemical or physical state of the dielectric between the plates. Moreover, it is well recognized that the resistivity of many substances accurately reflects their chemical composition.

In the past, many efforts have been made to utilize these variable impedance characteristics as a basis for controlling, indicating, measuring or recording a variable condition. While these efforts have been successful in many particular cases, there are nevertheless shortcomings in the devices heretofore proposed.

One of the shortcomings is attributable to inherent limitations of many of the variable impedance sensing elements. Thus, while the impedance of many of these elements varies in a predetermined manner with variations in environmental conditions, nevertheless the impedance is often of such a large magnitude that the current flow in connection with an element remains extremely minute for any reasonable impressed voltage. For example, the impedance of the humidity responsive element shown in my earlier patent, No. 2,377,426, varies from values of the order of several megohms to thousands of megohms. Consequently, for an impressed voltage of one hundred volts, the current flow never exceeds a few millionths of an ampere and as the resistance increases, the current drops to values more in the neighborhood of $10^{-9}$ ampere.

It is generally impractical to employ voltages in excess of a few hundred volts because of the difficulty encountered in providing insulators effective to prevent current leakage or short circuiting; as a result only infinitesimally small currents are available. Nor is it feasible simply to amplify these minute currents to obtain the necessary power for operating a control or indicating mechanism. Amplifiers having the gain characteristics requisite for suitable amplification of currents in this range are notorious for their instability and zero drift. Hence the inherent characteristics for these variable impedance elements, which limit current flow through them to extremely minute values, make it extremely difficult to utilize these elements for control functions.

Another shortcoming in devices heretofore proposed for controlling a variable condition is illustrated by the following example. Suppose it is desired to control the temperature of a liquid inside a container at 70° F. in a room whose temperature may assume any value from 80° F. to 60° F. When the room temperature is warmer than that of the liquid, its temperature may be controlled by properly circulating a cooling liquid through tubes immersed in the liquid. When the room temperature is cooler than that of the liquid, control may be accomplished by properly connecting an electric heater immersed in the liquid. When the room temperature is at 70°, no correction of the liquid's temperature would be necessary, after a reasonable time, since thermal equilibrium would be reached. However, if the temperature of the room makes cyclical changes between 60° and 80°, a control device would be required to circulate the cooling liquid, turn on the heater, or take neither action, according to the relative temperature of the liquid and that of the surrounding atmosphere in the room.

The difficulty with previously existing devices is that they are of the "two-way" type in which at all times either the heater or the cooling liquid pump is energized. Except during brief instants when changing from one corrective means to the other, there is no time at which a condition of equilibrium can exist. Consequently, the variation in the condition is excessive, and since the corrective means are in continuous operation, there is a tendency to continually overshoot the desired value.

One of the objects of this invention is to provide a "three-way" control in which the correcting means can be energized to drive the condition in one direction, to drive it in the opposite direction, or, if the condition coincides with the desired value, the correcting means remain unenergized and no action is taken.

A third shortcoming of some devices heretofore proposed is that, a variable impedance element operates certain contacts through electromagnets in such a way that, as the condition changes, the contacts begin gradually to close, approaching the closed position in an indefinite manner, easily altered by vibrations so that successful control may be attained in the laboratory but not when applied to many problems in industry. The present invention has for one of its objects to provide contacts which are definitely either on or off, and substantially uninfluenced by vibrations.

A further objective is to provide a control device effective to maintain a variable condition within predetermined limits which may be either very narrow, or adjustable to less narrow values. It will be appreciated that no control system can maintain a variable condition precisely at a predetermined value. Rather the predetermined, or selected value, is approximated by causing the variable condition to describe minute oscillations about the value; the condition itself generally varying from it by small amounts. In order to minimize the magnitude of the deviations of the variable condition from the selected value, the present device is effective to cause proportional correction. That is, the device of the present invention includes means whereby the rate of correction of the variable condition varies in accordance with the magnitude of its deviation from the selected value. The greater the deviation, the more rapid the correction, and as the variable condition approaches the desired value, the rate of correction is correspondingly reduced. In this manner, the tendency of the condition to "overshoot" the desired value is minimized.

It is still another objective of the present invention to provide a control device in which the sharpness of discrimination, or the narrowness of the limits within which a condition is maintained, can be readily varied. For example, suppose that humidity is the condition to be controlled. There are many installations in which it is desirable to maintain the selected humidity within a small fraction of a per-cent of the selected value. On the other hand, there are installations in which a variation of ten or twenty per-cent from a given value may not be objectionable, and if the control apparatus is adjusted to correct the humidity only if it exceeds these outer limits, appreciable savings can be effected in the operation of the humidity control system. It is obvious that if an installation requires only that the humidity should always be above a certain value, for example, the part of the control device which operates to reduce the humidity will not be needed. For such cases, the unneeded part of the control may be manually disconnected.

The device of this invention embodies a novel means for utilizing the minute currents available to accurately measure or control a variable condition, without introducing the instability and unreliability with previous devices.

In order that the significance of these objectives may be fully appreciated, a brief description of the principal features of the present device and its principles of operation will be given.

Generally, the present invention is predicated upon the concept of employing an electromotive force to charge a trigger capacitor in a circuit whose impedance is dependent on the condition to be controlled. The circuit impedance may be related to the alteration of the resistance of a sensing element in the circuit, as in the case of humidity control, or an alteration of the distance between the plates of a capacitor, as in pressure control or the alteration of any other of the circuit elements or any combination of them. The charge time, or length of time required by the capacitor to reach a predetermined voltage, is then used to regulate the completion of two independent power circuits. The first of these circuits, when completed, energizes corrective means for driving the variable condition toward a higher value; for example, the corrective means might function to add moisture, raise the temperature, raise pressure and the like. The second circuit, when completed, energizes corrective means for driving the variable condition in the opposite direction, toward lower values. The second means might be effective, for example, to remove moisture, lower the temperature, lower pressure, or the like. These two power circuits are alternately conditioned for completion during the regular periodic intervals by means independent of the trigger capacitor.

More specifically, in a control device constructed in accordance with this invention, voltage is impressed upon a sensing element, and the current flowing through the element is employed to charge a trigger condenser, which is in turn connected to the control grid of a suitable electron tube. When the accumulated charge on the condenser, which is proportional to the magnitude of the current, exceeds the breakdown point of the tube, the tube becomes conductive and the condenser discharges. The discharge of the capacitor activates a control circuit to close switches for completing one of the two power circuits which are sequentially conditioned for completion by independent means.

Since the charge time of the capacitor varies with the magnitude of the current flow, which in turn depends upon the impedance of the sensing element, reflecting its environmental condition, the charge rate of the condenser and the frequency of the condenser discharge are correlated with the value of the variable condition. For example, if the sensing element is of the type in which the impedance varies inversely with the variable condition, the charge time of the capacitor will range from comparatively long periods corresponding to low values of the variable condition to short periods corresponding to high values of the condition.

The operation of the control device of the present invention is cyclical, each cycle comprising a measurement of the condition and a period of corrective action. A cycle begins when the condition measurement is initiated and extends through the period of conditioning of both power circuits by the conditioning means. In any installation the cycle time is fixed, and is determined largely by the period of time during which the conditioning means readies each of the two power circuits for completion. The optimum length of cycle is selected in view of the characteristics of the particular installation embodying the control device. For many installations, a relative short cyclic period, such as twenty seconds provides a close control of the variable condition; in other installations it may be desirable to utilize cycles of considerably longer duration.

At the beginning of each cycle of operation, the first power circuit is conditioned for operation by the conditioning means, and the current flowing through the sensing element is supplied to the trigger condenser which starts to build up potential. If the variable condition is above its desired value, the trigger condenser will charge to the breakdown point rapidly and will activate the control circuit to complete the first power circuit while that circuit is conditioned for completion, thereby energizing the correcting means and causing a period of corrective action tending to lessen the value of the variable condition. At a predetermined time, the first circuit will be opened by the conditioning means ending the period of corrective action. Simultaneously, the second circuit is conditioned for closing, but the control circuit is so arranged that once the trigger condenser has discharged, the second circuit cannot be completed during the remainder of the cycle.

If on the other hand, the variable condition is lower than its normal value, the capacitor will require longer to reach the breakdown voltage of the tube. In fact, the capacitor will not discharge until some time after the first circuit has been deconditioned and the second circuit has been conditioned. As a result, the first power circuit will not be completed during its period of conditioning. The control circuit is arranged so that if the capacitor has not discharged, the second power circuit is completed as soon as it is conditioned and will remain closed until the condenser discharges. Consequently if the variable condition is too low, a period of corrective action tending to raise its value will commence upon conditioning of the second circuit. When the trigger capacitor eventually discharges, the second circuit will be opened to end the period of corrective action.

If the variable condition happens to coincide with the desired value, the trigger capacitor will discharge just as the first circuit is deconditioned and the second circuit is conditioned. Consequently the control circuit will attempt to complete the first power circuit, but this circuit will be held open for the remainder of the cycle by the conditioning means. The condenser discharge also results in the opening of the second power circuit, which is otherwise conditioned for completion. As a result, no corrective action will be taken during that particular cycle of operation.

Thus, it can be seen that the periods of corrective action depend upon the relationship of two time intervals, a fixed time interval corresponding to the period of conditioning of each of the power circuits, and a variable time interval corresponding to the charge time of the trigger capacitor. If the variable condition is too high, the first power circuit is completed from the time the trigger capacitor discharges until the power circuit is opened by the conditioning means; while if the condition is too low, the second power circuit is completed from the time it is conditioned until the trigger capacitor discharges. The control device will continue to function in this manner, cyclically measuring the condition and translating its values into aperiodic condenser discharges which control periods of corrective action effective to drive the condition back toward the selected value. It will be appreciated that if the impedance of the sensing element varies directly with the value of the variable condition, rather than inversely with it, the corrective means associated with the first and second power circuits will be interchanged, but otherwise the control device will function in the manner just outlined.

Since the capacitor discharges and the corrective means are energized very early in the cycle if the value of the variable condition is much too high, and somewhat later if the condition is nearer the selected value, the length of the corrective action period varies with the degree of divergence of the variable condition from its selected value. Conversely, if the value of the condition is much too low, the capacitor discharge will be delayed for a prolonged period, and there will be extensive corrective action tending to increase the value of the variable condition. However if the variable condition should be only slightly below its selected value, the capacitor will discharge earlier, and the period of corrective action tending to increase the condition's value will be of a shorter duration; so that again the rate at which the condition is corrected depends upon the magnitude of its divergence from the selected value.

Other advantages of the present invention will be apparent from the following detailed description of the drawing illustrating a typical embodiment of the invention that has been chosen for the purpose of illustration. From the description of this embodiment, and from the foregoing description of the general principles of this invention, those skilled in the art will readily comprehend various modifications to which the invention is susceptible.

The drawing illustrates an embodiment of my invention that is particularly adapted for controlling humidity. This application is chosen merely for the purpose of illustration, and I will explain in greater detail below how this same general arrangement can be employed for controlling or indicating the value of any variable condition. The heavy lines in the schematic circuit diagram indicate the power circuits for energizing the corrective apparatus. The light lines represent the control circuit which is effective to govern the completion of the power circuits.

More particularly, assuming that the humidity of space 10 is the medium to be controlled, two separate air flow systems 11 and 12 may be connected to the space. The first of these systems 11 includes a blower 13, valves 14 and 15, and some means such as a water atomizer 16 for introducing moisture into the stream of air flowing through conduit 17. Consequently when the valves are open and blower 13 is in operation, the air within space 10 will become more humid.

Similarly the second air system 12 includes valves 18 and 20, blower 21, conduits 22, and means such as a dryer indicated at 23 for removing moisture from the stream of air flowing through conduit 22. Consequently when blower 21 is energized, and valves 18 and 20 are open, the air circulated through this system will be effective to reduce the humidity of space 10.

Blower 13, and electrically responsive valves 14 and 15 in system 11, are connected in parallel to lines 24 and 25 of a circuit generally indicated at 26. Line 24 is connected to main power line 27, while line 25 is connected to the other main power line 28, through control switch 30, conditioning switch 31 and switch 32. Whenever switches 30 and 32 are closed, and the contact 43 of switch 31 is in position 45, blower 13 will be energized, valves 14 and 15 will be opened, and air will circulate through system 11.

Similarly valves 18 and 20, and blower 21, are connected in parallel across lines 33 and 34 of circuit 35. Line 33 is joined to power line 27, while 34 is returned to power line 28 through switches 36, 31 and 32. Consequently when the contactor of switch 31 is in position 43, and switches 32 and 36 are closed, valves 18 and 20 are opened, blower 21 is energized, and air will be circulated through system 12.

Switch 32 and conditioning switch 31 are both snap action switches, operated in accordance with the position of a time control element, which, in the illustrated apparatus, is furnished by disc 37. Any suitable mechanical, or electrical timer means may be utilized to provide the fixed time interval control; in the embodiment shown, disc 37 is driven at a constant rate of speed by means of a suitable motor, not shown. The speed of rotation of this disc determines the cycle time, as will be more fully explained in the following description. Switch 32 is provided with a finger 38 residing part of the time in mechanical contact with the disc; the switch is closed so long as finger 38 engages the peripheral portion 40 of the disc, and is open whenever the finger is in registry with the removed segment 41. The conditioning switch 31 also includes a finger 42 disposed for engagement with the rotating disc. The conditioning switch, in addition, is provided with a movable contact arm 43 which is adapted to engage either contact 44 or contact 45. Arm 43 is shiftable in response to movements of finger 42, and engages contact 44 so long as the finger is in registry with removed portion 41 of disc 37. The arm 43 is shifted to contact 45 when finger 42 is struck by edge 46 of the disc, and remains in engagememnt with contact 45 so long as finger 42 resides on the peripheral portion 40 of the disc.

When switch 32 is closed, and arm 43 of conditioning switch 31 is in engagement with contact 44, circuit 35 is conditioned for energization; and when switch 32 is closed, and arm 43 engages contact 45, circuit 26 is conditioned for energization. Consequently, switch 32 and conditioning switch 31 cooperate to alternately condition in timed sequence circuits 26 and 35 for completion; the completion of these circuits being effectuated by control switches 30 and 36. Control switches 30 and 36 are in turn operated by means of the control circuit shown in light lines.

The control circuit includes a conventional source of direct current indicated at 47. In the embodiment shown, lead 48 is maintained at a positive potential of 300 volts, and is connected through resistances 50, 51 and sensing resistor 52 to cycling switch 53, and then to grounded resistance 54. Two voltage regulator tubes 55 and 56 are connected to lead 48 at 57, and function to maintain the voltage at junction 57 at 255 volts irrespective of reasonable variations in the voltage of source 47.

Sensing resistor 52 is a condition responsive element; that is, the resistor displays a variation in impedance or conductivity in accordance with variations in its state or environment. In the embodiment shown, sensing resistor 52 is humidity responsive, and can be of the type disclosed in my Patent No. 2,377,426. Such a device includes a grid or filament of an organic hydrophilic gel, the resistivity thereof varying with the humidity of the surrounding air. More specifically, the resistance varies from a value of a few megohms corresponding to a high relative humidity, to a value of many thousand megohms corresponding to a low humidity.

A trigger capacitor 58 is connected to resistance 54 in parallel with cycling switch 53, which is in effect a short circuiting switch, and resistance 54, the capacitor being charged whenever the switch is open and current is flowing through sensing resistor 52. A gaseous triode tube 60 is associated with the trigger capacitor, and has a grid 61 which is connected to one end of the capacitor. Cathode 62 of tube 60 is grounded along with the opposite end of capacitor 58 and resistance 54. Anode 63 of tube 60 is joined to lead 48 through the parallel combination of capacitor 64, and current limiting resistor 65.

Cycling switch 53, which controls the charging of the trigger capacitor, is operated in response to the energization of coil 66; the switch being closed whenever current is flowing through the coil. One end of coil 66 is grounded as at 67, while the opposite end is connected to the 300 volt power source through lead 68, switch 70, and leads 71 and 48. Switch 70 is provided with a finger 72 disposed for engagement with the periphery of disc 37. The switch is constructed so that when finger 72 engages portion 40 of the disc, the switch is open, and when the finger is in registry with removed segment 41, the switch is closed.

A series combination of auxiliary capacitor 73 and resistor 74 is connected from lead 48 to ground in parallel with voltage regulator tubes 55 and 56. A lead 75, taken between the capacitor and resistor, is joined to control grid 76 of tube 77. Tube 77 is a gaseous discharge tube including a grounded screen grid 78 and a cathode 80 which is connected through conductor 81 to lead 82. Lead 82 is grounded through resistance 83, and is connected through resistance 84 to lead 48. Anode 85 of tube 77 is connected to relay coil 86, the other end of the coil being joined to conductor 87 which is in turn connected through reset switch 88 to lead 48.

Relay coil 86 controls the position of switches 36 and 30. That is, when the coil is energized through a circuit from line 48 including lead 87, reset switch 88, tube 77, lead 81, and grounded resistor 83, switch 36 is closed and switch 30 is open. Conversely when the circuit including coil 86 is open, due either to the nonconductive state of tube 77, or the open condition of switch 88, then switch 30 is closed and switch 36 is opened. Reset switch 88 has a finger 90 positioned for engagement with disc 37. The switch is closed so long as the finger is in contact with peripheral portion 40, and is open when the finger resides in removed segment 41.

In the preferred embodiment, fingers 38, 72 and 90, of switches 32, 70 and 88, respectively are positioned adjacent to one another so that the three switches will be operated almost simultaneously. Conditioning switch 31 is arranged so that its finger 42 is spaced from these switches along the periphery of disc 37 a distance substantially equal to the length of the removed segment 41. For most installations it is preferable that the length of the removed segment correspond to approximately ⅓ of the periphery of disc 37. As a result, edge 46 trips finger 42 at approximately the midpoint of the interval during which switch 32 is held closed by engagement of portion 40 with finger 38. Consequently, as will be explained more fully below, circuits 26 and 35 are conditioned for operation for approximately equal periods of time.

Operation of apparatus

In operation, conventional current will flow in the control circuit from the positive terminal of source 47, through resistances 50 and 51, sensing resistance 52, switch 53 and resistance 54 to ground. A cycle of operation begins when disc 37 is rotated, so that edge 46 engages finger 72 of switch 70. This opens switch 70, deenergizing relay coil 66, and opening cycling switch 53. When switch 53 opens, it removes the low impedance path to ground for the current flowing through sensing resistance 52, and this current begins to charge trigger capacitor 58. The potential across this capacitor continues to build up until the potential of grid 61 is sufficient to cause ionization of the gas in tube 60. Thereupon trigger capacitor 58 discharges through the gas to cathode 62. Once ionization has commenced, conduction also takes place between anode 63 and cathode 62.

When tube 60 becomes conductive, capacitor 73 which has meanwhile become charged since it is connected to the 255 volt line 48, discharges through tube 60 to ground; at substantially the same time current also flows from the D. C. source through resistance 50, 51 and tube 60 to ground. Capacitor 64 permits a large pulse of current to flow to anode 63, but prevents a steady current flow. While resistor 65 permits a steady current flow, the impedance of this resistor is so large that insufficient current flows through it to maintain conduction between the anode and cathode of tube 60. As a result, the discharge of trigger condenser 58 is followed by a sudden pulse of current flowing through tube 60, and the conduction through the tube ceases. However, resistance 65 does function as a leakage resistance which is effective to maintain the voltage of anode 63 at 255 volts to insure stable operation of the circuit.

It will be appreciated that the length of time elapsing between the opening of cycling switch 53, and the discharge of trigger condenser capacitor 58, depends principally upon the electrical capacity of the trigger capacitor and on the electrical resistance of sensing element 52. Hence, if either the sensing element or the trigger capacitor, or both, are of such a nature that their impedance varies according to their environment, the elapsed time will likewise vary in conformity with the environmental condition. In the embodiment shown, the resistance of sensing element 52 varies between a few megohms and many thousands of megohms depending upon the relative humidity in space 10, the impedance of the resistor being low for high values of relative humidity, and high for low values. Therefore, the higher the humidity, the more rapidly the capacitor will charge; and the lower the humidity, the longer the capacitor will take to charge.

At substantially the same time that corner 46 engages finger 72, it strikes fingers 90 and 38, closing switches 88 and 32. These switches remain closed until edge 91 passes under their fingers bringing them into registry with removed segment 41. If the humidity in space 10 is higher than the selected value, sensing element 52 will have a relatively low impedance and trigger capacitor 58 will build up potential rapidly, elevating grid 61 above the breakdown voltage of tube 60 before corner 46 reaches switch 31.

As soon as tube 60 becomes conductive, auxiliary condenser 73, which has become charged to 255 volts because of its connection to line 48, discharges to ground; elevating the potential of grid 76 of tube 77 to a point where that tube also becomes conductive. When tube 77 becomes conductive, current flows from the 300 volt source through line 87 and switch 88 to relay coil 86, from which the current is returned to ground through tube 77, lead 81 and resistor 83. The energization of relay coil 86 results in the closing of switch 36, and opening of switch 30. It will be seen that prior to the energization of relay coil 86, neither power circuit was closed since line 34 of circuit 35 was open at switch 36, and line 25 of circuit 26 was open at switch 31. However after switch 36 is closed, circuit 35 which is conditioned for completion by the position of switch arm 43 is completed, opening valves 18 and 20 and energizing blower 21, causing a quantity of dry air to be forced into chamber 10 to drive the humidity condition of that space to a lower value.

Power circuit 35 will remain closed until edge 46 of disc 37 reaches conditioning switch 31 and engages finger 42, thereby shifting arm 43 to contact 45. This opens circuit 35, and conditions circuit 26 for completion. However power circuit 26 is open at switch 30, and will remain so for the remainder of the operating cycle. Switch 30 can only close on the deenergization of relay coil 86; but since grid 76 has lost control of thyratron 77, the latter remains conductive, completing the circuit to the relay coil until the positive potential is removed from anode 35 by the opening of switch 90 at the end of the cycle. Consequently, during the latter portion of the cycle, neither system 11 or system 12 is in operation.

At the close of the operating cycle, disc 37 rotates to a point where edge 91 closes switch 70 and opens switches 88 and 32. Closing switch 70 results in the energization of relay coil 66, and consequently in the closing of cycling switch 53. When switch 53 is closed, capacitor 58 is short circuited by a low impedance path, removing any potential which may have built up. It should be noted with reference to the trigger capacitor that after it has once discharged during a cycle, subsequent pulses of current passing through tube 60 before the end of the cycle, will have no effect, since after thyratron 77 once becomes conductive its grid loses control and the tube will remain conductive until its plate circuit is opened at switch 88.

It is apparent that the higher the humidity in space 10, the lower will be the resistance of sensing element 52, as a result, the trigger condenser will charge more rapidly and power circuit 35 will be energized for a longer period of time. Conversely, if the humidity in space 10 is just slightly above the desired value, the resistance of element 52 will be higher and trigger capacitor 58 will discharge later in the cycle, reducing the period of corrective action. Thus, the rate at which the humidity is corrected is proportional to the magnitude of its deviation from the selected value. As a result, there is a minimum tendency to overshoot the selected value and cause the relative humidity of space 10 to oscillate between values appreciably above and below the selected value.

Prior to the beginning of the next cycle, edge 91 of disc 37 will pass under finger 42, shifting arm 43 back to contact 44, thereby reconditioning circuit 35 for completion. Edge 46 will then have opened switch 70 and closed switches 88 and 32 as in the previous cycle. Assuming that the humidity in space 10 is now too low, the resistance of sensing element 52 will have increased substantially. As a result, the current flow charging capacitor 58 will be reduced and tube 60 will not be rendered conductive until after edge 46 has actuated switch 31 to condition circuit 26 for completion. Since the capacitor has not discharged, when arm 43 engages contact 45, relay coil 86 is not energized, and switch 30 is closed so that circuit 26 is completed as soon as the arm 43 is shifted. Circuit 26, which energizes blower 13 and opens valves 14 and 15 to supply moist air to space 10, will remain closed from the time edge 46 engages finger 42 until capacitor 58 discharges, activating the control circuit to energize relay 86 and open switch 30.

It will be clear that the drier the air in chamber 10 the higher will be the resistance of sensing element 52, and, consequently, the longer the delay before condenser 58 reaches the breakdown potential of tube 60. Since system 11 operates until the condenser discharges, the period of corrective action will be lengthened and again the rate of correction will vary with the magnitude of the deviation of the humidity condition from the selected value. If the humidity of space 10 should coincide exactly with the desired value, then sensing element 52 will have an impedance of such a magnitude that trigger capacitor 58 will discharge just as edge 46 actuates switch 31. Consequently, when circuit 35 is conditioned for completion, switch 36 will be open, and when circuit 26 is conditioned, switch 30 will be open. As a result, neither circuit will be completed during the operating cycle and no action will be taken to alter the humidity of the space.

In actual operation of this device, when the humidity of space 10 is very nearly equal to the desired value, either circuit 35 is correctly completed or 26 is correctly completed, as the very small difference in humidity may require. However, due to the electrical and mechanical inertia involved, the corresponding valves and blower do not actually operate. Thus there is a small region of humidity in the immediate neighborhood of the desired value of humidity at which no actual correction takes place. This is spoken of in what follows as the "discrimination" of the device, and it is one of the particular features of this invention that it does not operate to increase or decrease the value of the humidity within a very small range of values near the desired value. This range of values, or discrimination may obviously be reduced to a certain practical minimum. It however may be increased above that minimum by inserting electrical time-delay devices in appropriate places in the circuit or by increasing the mechanical inertia of the moving parts. The fact that the degree of discrimination may be altered at will, is also one of the features of the invention.

While this invention has been disclosed in an embodiment adapted to function as a humidity control device, it will be appreciated that the device may readily be employed to control other conditions just as well. For example, sensing element 52 may be a temperature responsive element, and corrective means 16 and 23 respectively functioned to add or remove heat, whereby the device may control the temperature of space 10 in exactly the same manner as humidity is controlled in the illustrated embodiment.

A further modification of the embodiment shown can be made if it is desired to vary the variable condition being controlled as a function of a third variable (for example, time). This can be accomplished by arranging the trigger capacitor so that its impedance changes as a function of the third variable or alternatively by making several sensing elements, such as capacitor 58 or resistor 54, vary accordingly. In fact, by making the impedance of a plurality of these elements vary as a function of a variable, the condition being controlled can be made to vary as a function of a combination of several variables (for example, time and temperature).

In a further modification, the principles of this invention may be used to construct a device adapted to indicate the value of a variable condition instead of controlling it. This could be accomplished by connecting a lamp bulb of one color across circuit 26 and a bulb of a different color across circuit 35. By noting how long one or the other lamp burned during each cycle, one could obtain an indication of the value of the variable condition being measured. Obviously, suitable recording devices could also be connected across circuits 26 and 35 for making a record of the variable condition, and these devices could be coupled with corrective means if desired so that the device both indicated and controlled the value of a variable condition.

Having described my invention, I claim:

1. A device for controlling a variable condition, said device comprising a first electrically responsive means for increasing the value of the condition, a second electrically responsive means for decreasing the value of the condition, a power circuit associated with each of said means, means for periodically conditioning said power circuits for completion, a control circuit for regulating the completion of said power circuits, said control circuit including a variable impedance sensing element associated with the variable condition, a trigger condenser in circuit connection with said sensing element, so that the charge time of the condenser varies with the impedance of the sensing element, a gaseous discharge tube including a control grid connected to said trigger condenser, said tube being adapted to fire when the condenser reaches a predetermined potential, switch means operated in response to the firing of the tube, said switch means including contacts in said power circuits.

2. A device for controlling a variable condition, said device comprising first electrically responsive means for increasing the value of the condition, second electrically responsive means for decreasing the value of condition, a power circuit associated with each of said means, each of said power circuits, including a conditioning switch and a completion switch, means for actuating the conditioning switch whereby said power circuits are alternately conditioned for closing by the completion switches, and a control circuit for actuating said completion switches, said control circuit including a variable impedance sensing element associated with the variable condition, a trigger condenser in circuit connection with said sensing element, an electron discharge tube having a control grid electrically connected with said condenser, and a relay coil energized in response to the firing of said electron tube, said relay coil when energized being effective to actuate said completion switches.

3. A device for controlling a variable condition comprising first electrically responsive correcting means for increasing the value of the condition, second electrically responsive correcting means for decreasing the value of the condition, a power circuit associated with each of said means, a control circuit including a variable impedance sensing element responsive to the variable condition, a gaseous discharge tube having a control grid, a trigger condenser in circuit connection with said sensing element and the control grid of said discharge tube, a second gaseous discharge tube adapted to fire in response to the firing of the first tube, switch means normally in closed circuit connection with one of the power circuits and actuable in response to the firing of the second gaseous discharge tube for establishing a circuit to the other of said correcting means.

4. A device for controlling a variable condition comprising first electrically responsive correcting means for increasing the value of the condition, second electrically responsive correcting means for decreasing the value of the condition, a power circuit associated with each of said means, means for sequentially conditioning said power circuits for completion, a control circuit including a variable impedance sensing element responsive to the variable condition, a gaseous discharge tube having a control grid, a trigger condenser in circuit connection with said sensing element and the control grid of said discharge tube, a second gaseous discharge tube adapted to fire in response to the firing of the first tube, switch means normally in closed circuit connection with one of the power circuits and actuable in response to the firing of the second gaseous discharge tube for establishing a circuit to the other of said correcting means.

5. A device for controlling a variable condition comprising first electrically responsive means for increasing the value of the condition, second electrically responsive means for decreasing the value of the condition, a power circuit associated with each of said means, means for alternately conditioning said circuits for predetermined periods, switch means for completing said power circuits, a control circuit for actuating said switch means, said control circuit including a variable impedance sensing element responsive to the variable condition, a gaseous discharge tube having a control grid, a trigger condenser in circuit connection with said sensing element and the control grid of said discharge tube, a second gaseous discharge tube adapted to fire in response to the firing of the first tube, said switch means being actuatable in response to the firing of said second discharge tube.

6. A device for controlling a variable condition comprising first electrically responsive means for increasing the value of the condition, second electrically responsive means for decreasing the value of the condition, a power circuit associated with each of said means, conditioning means for sequentially conditioning said circuits for completion, a variable impedance sensing element responsive to the variable condition, a trigger condenser in circuit connection with said sensing element, means responsive to the discharge of the trigger condenser for completing said power circuits, the means responsive to the discharge of the trigger condenser being effective to complete the first power circuit upon the discharge of the trigger condenser, said circuit remaining energized until it is deconditioned by the conditioning means, the second of said power circuits to be conditioned being completed upon its conditioning and remaining completed until the actuation of the means responsive to the trigger condenser following the trigger condenser discharge.

7. A device for controlling a variable condition comprising first electrically responsive correcting means for increasing the value of the condition, second electrically responsive correcting means for decreasing the value of the condition, a power circuit associated with each of said means, conditioning means for sequentially conditioning said circuits for completion, a control circuit including a variable impedance sensing element responsive to the variable condition, a trigger condenser in circuit connection with said sensing element, a gaseous discharge tube having a control grid connected with said condenser, means normally in closed circuit connection with one of the power circuits and actuable in response to the firing of the discharge tube for establishing a circuit to the other of said correcting means, one of said power circuits being adapted for completion from the time that the trigger condenser discharges until the power circuit is deconditioned, the other of said circuits being adapted for completion from the time it is conditioned until the time the trigger condenser discharges.

8. A device for maintaining a variable condition at a selected value, said device comprising first electrically responsive means for increasing the value of condition, and second electrically responsive means for decreasing the value of condition, a power circuit associated with each of said means, each of said power circuits, including a conditioning switch and a completion switch, means for actuating said conditioning switch whereby said power circuits are alternately conditioned for closing by the completion switches, and a control circuit for actuating said completion switches, said control circuit including a variable impedance element, a trigger condenser in circuit connection with said sensing element, a first gaseous discharge tube having a control grid electrically connected with said condenser, a second gaseous discharge tube in circuit connection with said first gaseous tube and arranged to become conductive in response to the firing of the first discharge tube, and a relay coil energized in response to the firing of said second tube, said relay coil when energized being effective to actuate said completion switches whereby the switch in the first conditioned power circuit is closed and the switch in the next conditioned power circuit is opened.

9. A device for maintaining a variable condition at a selected value, said device comprising first electrically responsive means for increasing the value of the condition and, second electrically responsive means for decreasing the value of the condition, a power circuit associated with each of said means, each of said power circuits, including a conditioning switch and a completion switch, means for actuating said conditioning switch whereby said power circuits are alternately conditioned for closing by the completion switches, and a control circuit for actuating said completion switches, said control circuit including a variable impedance element, a trigger condenser in circuit connection with said sensing element, a gaseous discharge tube having a control grid electrically connected with said condenser, a second gaseous discharge tube arranged to become conductive in response to the firing of the first discharge tube, and a relay coil energized in response to the firing of said second tube, said relay coil when energized being effective to actuate said completion switches whereby the switch in the first said conditioned power circuit is closed and the switch in the next conditioned power circuit is opened, said trigger condenser being effective to fire said first discharge tube at substantially the same time that the first conditioned power circuit is deconditioned and the other power circuit is conditioned when the variable condition coincides with the selected value.

10. A device for controlling a variable condition so that the condition is maintained within predetermined limits, comprising first electrically responsive means for increasing the value of the condition, second electrically responsive means for decreasing the value of the condition, a power circuit associated with each of said means, conditioning means for sequentially conditioning said circuits for completion, a variable impedance sensing element responsive to the variable condition, a trigger condenser in circuit connection with said sensing element, means responsive to the discharge of the trigger condenser for completing said power circuits, the means responsive to the discharge of the trigger condenser being effective to complete the first power circuit upon the discharge of the trigger condenser, said circuit remaining energized until it is deconditioned by the conditioning means, the second of said power circuits to be conditioned being completed upon its conditioning and remaining completed until the actuation of the means responsive to the trigger condenser following the trigger condenser discharge.

11. A device for controlling a variable condition so as to maintain it at a selected value, comprising first electrically responsive means for increasing the value of the condition, second electrically responsive means for decreasing the value of the condition, a power circuit associated with each of said means, cyclically operable conditioning means for sequentially conditioning said circuits for completion, a variable impedance sensing element responsive to the variable condition, a gaseous discharge tube including a control grid, a trigger condenser in circuit connection with said sensing element and the control grid of said gaseous discharge tube, a cycling switch effective to control the flow of current from said sensing element to said trigger capacitor, means responsive to the discharge of the said condenser for completing said power circuits, the means responsive to the discharge of the trigger condenser being effective to complete the first power circuit upon the discharge of the trigger condenser, said circuit remaining energized until it is deconditioned by the conditioning means, the second of said power circuits to be conditioned being completed upon its conditioning and remaining completed until the actuation of the means responsive to the trigger condenser following the trigger condenser discharge, said cycling switch being operated in timed relationship with the operation of said conditioning means whereby current is flowing to said trigger capacitor while one of said power circuits is conditioned for completion, and when the variable condition coincides with its selected value said capacitor will discharge as that circuit is deconditioned and the opposite circuit is conditioned.

12. A device for controlling a variable condition comprising first electrically responsive correcting means for increasing the value of the condition, second electrically responsive correcting means for decreasing the value of the condition, a power circuit associated with each of said means, conditioning means for sequentially conditioning said circuits for completion, a variable impedance sensing element responsive to the variable condition, a trigger condenser in circuit connection with said sensing element, means responsive to the discharge of the said condenser for completing said power circuits, said means being in normally closed circuit relationship with the power circuit associated with the second correcting means, and being actuable in response to the discharge of said condenser to close the first power circuit; the second power circuit being completed from the time that the trigger condenser discharges until the power circuit is deconditioned, the other of said circuits completed from the time it is conditioned until the time the trigger condenser discharges.

13. A device for controlling a variable condition so as to maintain it at a selected value, comprising first electrically responsive means for increasing the value of the condition, second electrically responsive means for decreasing the value of the condition, a power circuit associated with each of said means, cyclically operable conditioning means for sequentially conditioning said circuits for completion, a variable impedance sensing element responsive to the variable condition, a gaseous discharge tube including a control grid, a trigger condenser in circuit connection with said sensing element, and the control grid of said gaseous discharge tube, a cycling switch effective to control the flow of current from said sensing element to said trigger capacitor, means responsive to the discharge of the said condenser for completing said power circuits, said means being in normally closed circuit relationship with the power circuit associated with the second correcting means, and being actuable in response to the discharge of said condenser to close the first power circuit; the second power circuit completed from the time that the trigger condenser discharges until the power circuit is deconditioned, the other of said circuits being completed from the time it is conditioned until the time the trigger condenser discharges.

14. A device for measuring a variable condition, said device comprising electrically responsive means for indicating the value of condition when it exceeds a predetermined value, electrically responsive means for indicating the value of the condition when it is smaller than the predetermined value, a power circuit associated with each of said means, each of said power circuits including a conditioning switch and a completion switch, means for actuating said conditioning switch whereby said power circuits are alternately conditioned for closing by the completion switches, and a control circuit for actuating said completion switches, said control circuit including a variable impedance sensing element, a trigger condenser in circuit connection with said sensing element, an electron discharge tube having a control grid electrically connected with said condenser, said tube being fired when the condenser potential rises above a predetermined value, and a relay coil energized in response to the firing of said tube, said relay coil when energized being effective to close one of the said completion switches and open the other of said completion switches.

15. In a device for maintaining a variable condition at a predetermined value, the combination of electrically responsive means for driving the variable condition in one direction, a power circuit associated with said means, means for periodically conditioning the power circuit for completion, switch means for completing said power circuit, a control circuit for actuating said switch means, said control circuit including a variable impedance sensing element responsive to the variable condition, a gaseous discharge tube having a control grid, a trigger condenser in circuit connection with said sensing element and the control grid of said discharge tube, said switch means being actuatable in response to the firing of said discharge tube, said trigger condenser being charged to a potential effective to fire said discharge tube at substantially the same time said power circuit is deconditioned when the variable condition coincides with the predetermined value.

References Cited in the file of this patent
UNITED STATES PATENTS

| | | |
|---|---|---|
| 1,540,322 | Folsom | June 2, 1925 |
| 2,304,188 | McGrath | Dec. 8, 1942 |
| 2,366,500 | Eastin | Jan. 2, 1945 |
| 2,416,261 | Kemper | Feb. 18, 1947 |
| 2,519,789 | Perkins | Aug. 22, 1950 |
| 2,593,562 | Hornfeck | Apr. 22, 1952 |